ус010006353B2

(12) United States Patent
Koike et al.

(10) Patent No.: US 10,006,353 B2
(45) Date of Patent: Jun. 26, 2018

(54) TURBOCHARGER SYSTEM AND CONTROL METHOD FOR THE SAME

(71) Applicant: IHI Corporation, Koto-ku (JP)

(72) Inventors: Atsushi Koike, Tokyo (JP); Tsuyoshi Nishiyama, Tokyo (JP); Kazuhiko Shinagawa, Tokyo (JP); Mitsushi Maeyama, Tokyo (JP); Satoshi Kusano, Tokyo (JP); Yuji Kobayashi, Tokyo (JP); Masanori Okada, Tokyo (JP)

(73) Assignee: IHI Corporation, Koto-ku (JP)

( * ) Notice: Subject to any disclaimer, the term of this patent is extended or adjusted under 35 U.S.C. 154(b) by 821 days.

(21) Appl. No.: 14/308,769

(22) Filed: Jun. 19, 2014

(65) Prior Publication Data

US 2014/0301831 A1    Oct. 9, 2014

Related U.S. Application Data

(63) Continuation of application No. PCT/JP2013/050274, filed on Jan. 10, 2013.

(30) Foreign Application Priority Data

Jan. 12, 2012    (JP) ................ 2012-004473

(51) Int. Cl.
     *F02B 37/22*      (2006.01)
     *F02B 37/18*      (2006.01)
     (Continued)

(52) U.S. Cl.
     CPC ............ *F02B 37/22* (2013.01); *F02B 37/183* (2013.01); *F02B 39/16* (2013.01);
     (Continued)

(58) Field of Classification Search
     CPC ........ F02B 37/00; F02B 37/18; F02B 37/183; F02B 37/186; F02B 37/22; F02B 39/16;
     (Continued)

(56) References Cited

U.S. PATENT DOCUMENTS

5,605,044 A   *   2/1997   Zimmer ................. F02B 37/16
                                                                      60/602
5,960,631 A      10/1999   Hayashi
     (Continued)

FOREIGN PATENT DOCUMENTS

JP         62-175237 U      11/1987
JP         2003-214171 A      7/2003
     (Continued)

OTHER PUBLICATIONS

Extended European Search Report dated Jul. 20, 2015 in Patent Application No. 13735573.1.
(Continued)

*Primary Examiner* — Kenneth Bomberg
*Assistant Examiner* — Julian Getachew
(74) *Attorney, Agent, or Firm* — Oblon, McClelland, Maier & Neustadt, L.L.P.

(57) ABSTRACT

A turbocharger system of an embodiment includes: a wastegate valve; an electrically-operated actuator configured to adjust a valve lift of the wastegate valve; a temperature acquisition unit configured to acquire a target temperature which is a temperature of the turbocharger body or a temperature correlating with the temperature of the turbocharger body; and an actuator controller configured to control the electrically-operated actuator on the basis of the target temperature. The temperature acquisition unit acquires the target temperature, and the actuator controller controls the electrically-operated actuator on the basis of the target temperature.

5 Claims, 5 Drawing Sheets

(51) Int. Cl.
  *F02B 39/16* (2006.01)
  *F02D 41/24* (2006.01)
  *F02D 41/14* (2006.01)
  *F02D 41/00* (2006.01)

(52) U.S. Cl.
  CPC ..... *F02D 41/0007* (2013.01); *F02D 41/1446* (2013.01); *F02D 41/2429* (2013.01); *Y02T 10/144* (2013.01)

(58) Field of Classification Search
  CPC ...... F02C 6/12; F01D 17/105; F02D 41/0007; F02D 41/2429; F02D 41/1446
  See application file for complete search history.

(56) References Cited

U.S. PATENT DOCUMENTS

| | | |
|---|---|---|
| 2010/0024418 A1 | 2/2010 | Xiao |
| 2012/0001111 A1 | 1/2012 | Takeda et al. |

FOREIGN PATENT DOCUMENTS

| | | |
|---|---|---|
| JP | 2006-274834 A | 10/2006 |
| JP | 2007-92622 A | 4/2007 |
| JP | 2009-185737 A | 8/2009 |
| JP | 2009-299505 A | 12/2009 |
| JP | 2010-31829 A | 2/2010 |
| JP | 4434057 B2 | 3/2010 |
| JP | 2010-121534 A | 6/2010 |
| JP | 2010-216305 A | 9/2010 |
| JP | 2011-190778 A | 9/2011 |

OTHER PUBLICATIONS

International Search Report dated Apr. 16, 2013 for PCT/JP2013/050274 filed on Jan. 10, 2013 with English Translation.
International Written Opinion dated Apr. 16, 2013 for PCT/JP2013/050274 filed on Jan. 10, 2013.

* cited by examiner

TURBOCHARGER SYSTEM AND CONTROL METHOD FOR THE SAME

CROSS REFERENCE TO RELATED APPLICATIONS

This application is a continuation application of International Application No. PCT/JP2013/050274, filed on Jan. 10, 2013, which claims priority to Japanese Patent Application No. 2012-004473, filed on Jan. 12, 2012, the entire contents of which are incorporated by references herein.

BACKGROUND OF THE INVENTION

1. Field of the Invention

The present invention relates to a turbocharger system and a control method for the same.

2. Description of the Related Art

Turbochargers have been known as being used to increase output of engines and the like by being connected thereto. As boost pressure of a turbocharger becomes higher, the subsequent flow rate and pressure of the exhaust gas become higher. As the torque of the turbocharger becomes higher, the boost pressure becomes much higher. As a result, the engine and the turbocharger become more likely to suffer damage. To avoid this, some turbocharges have a function of suppressing the pressure of the exhaust gas flowing into a turbine housing by making part of the exhaust gas flow from the engine to the downstream of the turbine while bypassing the turbine.

A turbocharger having the foregoing function is provided with a bypass passage making the upstream and downstream of a turbine impeller communicate with each other. The turbocharger is further provided with a wastegate valve configured to open and close the bypass passage. Depending on the pressure in a compressor housing, the valve lift (a degree of opening) of the wastegate valve is adjusted by an actuator connected to the wastegate valve.

As the shape of the turbocharger changes with time, the relative positions of the wastegate valve and a hole to be closed by the wastegate valve also change. For this reason, the actuator, if electrically operated, becomes no longer capable of adjusting the opening of the hole appropriately even when controlling the wastegate valve. Japanese Patent No. 4434057 (PTL 1) has proposed a turbocharger having a function of resetting the relationship between the control amount and the valve lift of the wastegate valve when necessary.

SUMMARY OF THE INVENTION

The temperature of the turbocharger drastically changes depending on a use condition including, for example, output from the engine connected to the turbocharger. The thermal expansion associated with such a change in the temperature changes the overall shape of the turbocharger, and also changes the relative positions of the wastegate valve and the hole to be closed by the wastegate valve. For this reason, despite the use of the turbocharger described in PTL 1 with the wastegate valve controlled by the electrically-operated actuator, there is still a problem, due to temperature variations depending on use conditions, that the valve lift cannot be adjusted appropriately, i.e., that a leak may occur or the wastegate valve may apply too large tightening force to close the hole.

An object of the present invention is to provide a turbocharger system and a control method for the same, which are capable of appropriately adjusting the valve lift of the wastegate valve irrespective of the temperature of the turbocharger.

A first aspect of the present invention provides a turbocharger system which includes: a turbocharger body including a compressor housing and a turbine housing; a turbine shaft rotatably supported by the turbocharger body, and linking a turbine impeller in the turbine housing and a compressor impeller in the compressor housing; a wastegate valve configured to make part of a fluid to be guided to the turbine impeller flow to a downstream of the turbine impeller while bypassing the turbine impeller; an electrically-operated actuator connected to the wastegate valve, and configured to adjust a valve lift of the wastegate valve; a temperature acquisition unit configured to acquire a target temperature which is any one of a temperature of the turbocharger body and a temperature correlating with the temperature of the turbocharger body; and an actuator controller configured to control the electrically-operated actuator on the basis of the target temperature.

The turbocharger system may further include a storage unit configured to store association information which associates a correction value with the target temperature. In this case, the correction value is a difference value between a control value inputted into the electrically-operated actuator when the wastegate valve becomes fully closed at the target temperature associated with the correction value, and a reference value which is a control value inputted into the electrically-operated actuator when the wastegate valve becomes fully closed at a reference temperature. On the basis of the association information, the actuator controller may identify the correction value from the target temperature acquired by the temperature acquisition unit, calculate a control value by adding or subtracting the identified correction value to or from an input value for control of the electrically-operated actuator, and control the electrically-operated actuator on the basis of the calculated control value.

The storage unit may store as the association information a table in which the target temperature and the correction value are associated with each other.

The storage unit may store as the association information an arithmetic expression enabling the correction value to be calculated from the target temperature.

A second aspect of the present invention provides a turbocharger system controlling method for a turbocharger system, which includes an electrically-operated actuator configured to adjust a valve lift of a wastegate valve for making part of a fluid to be guided to a turbine impeller flow to a downstream of the turbine impeller while bypassing the turbine impeller. The controlling method includes: acquiring a target temperature which is any one of a temperature of a turbocharger body and a temperature correlating with the temperature of the turbocharger body; and controlling the electrically-operated actuator on the basis of the target temperature.

The present invention makes it possible to appropriately adjust the valve lift of the wastegate valve irrespective of the temperature of the turbocharger.

DESCRIPTION OF THE PREFERRED EMBODIMENTS

Referring to the accompanying drawings, descriptions will be provided for an embodiment of the present invention. Dimensions, materials, specific values and the like shown in the embodiment are provided as mere examples for the purpose of making the present invention easily understood, and do not limit the present invention unless otherwise indicated. Incidentally, in the description and drawings, components having virtually the same functions and configurations will be denoted by the same reference signs, and thereby, duplicated descriptions will be omitted. Furthermore, illustration of components not directly related to the present invention will be omitted.

Figure 1:
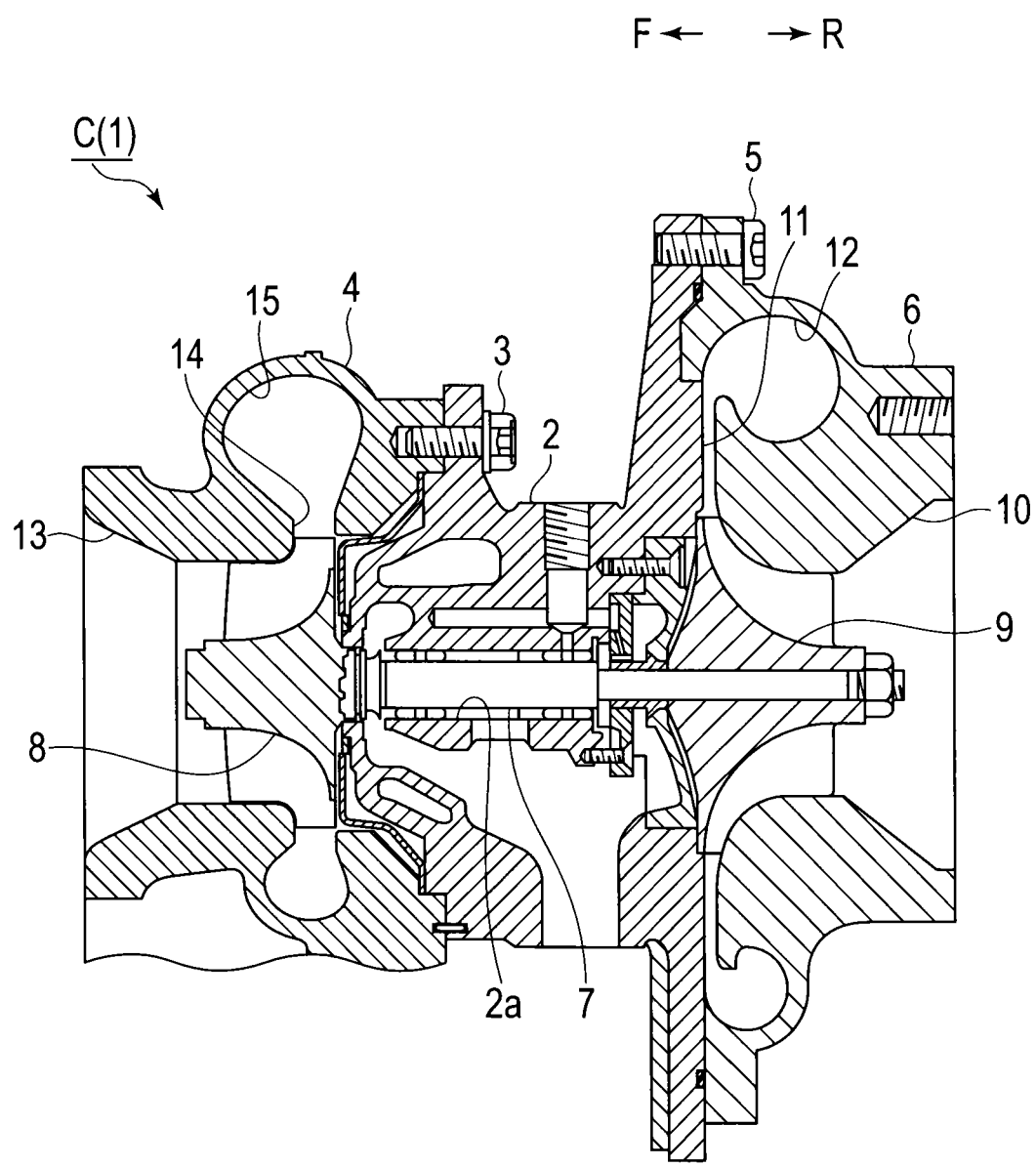
FIG. 1 is a schematic cross-sectional view of a turbocharger.

FIG. 1 is a schematic cross-sectional view of a turbocharger. In the following description, a direction of an arrow F indicates a front side of a turbocharger C while a direction of an arrow R indicates a rear side of the turbocharger C. As shown in FIG. 1, the turbocharger C includes a turbocharger body 1. The turbocharger body 1 includes a bearing housing 2, a turbine housing 4 and a compressor housing 6. The turbine housing 4 is situated in front of the bearing housing 2, and is connected to the hearing housing 2 with bolts 3. The compressor housing 6 is situated in the rear of the bearing housing 2, and is connected to the bearing housing 2 with bolts 5.

A bearing hole 2a is formed in the bearing housing 2. The bearing hole 2a penetrates the bearing housing 2 in a front-rear direction of the turbocharger C. A turbine shaft 7 is inserted in the bearing hole 2a, and is rotatably supported by the bearing hole 2a with bearings in between. A turbine impeller 8 is integrally linked (connected) to a front end portion (one end) of the turbine shaft 7. The turbine impeller 8 is rotatably housed in the turbine housing 4. In addition, a compressor impeller 9 is integrally linked (connected) to a rear end portion (the other end) of the turbine shaft 7. The compressor impeller 9 is rotatably housed in the compressor housing 6.

The compressor housing 6 includes an inlet port 10, which is opened toward the rear of the turbocharger C and connected to a not-illustrated air cleaner. The inlet port 10 is opened toward the rear of the turbocharger C, and is connected to the air cleaner, which is not illustrated. Furthermore, when the compressor housing 6 is connected to the bearing housing 2 with the bolts 5, the opposing surfaces of the two housings 2, 6 form a diffuser passage 11 configured to boost the pressure of the air by compressing the air. The diffuser passage 11 is formed into an annular shape from its inner to outer sides in radial directions of the turbine shaft 7 (the compressor impeller 9). The inner side of the diffuser passage 11 in the radial directions communicates with the inlet port 10 via the compressor impeller 9.

The compressor housing 6 includes an annular compressor scroll passage 12. The compressor scroll passage 12 is situated outward of the diffuser passage 11 in the radial directions of the turbine shaft 7 (the compressor impeller 9), communicates with an intake port of an engine, and communicates with the diffuser passage 11 as well. For this reason, once the compressor impeller 9 rotates, a fluid is taken into the compressor housing 6 from the inlet port 10; the pressure of the fluid taken in is boosted by the diffuser passage 11 and the compressor scroll passage 12; and the resultant fluid is guided to the intake port of the engine.

The turbine housing 4 includes a discharge port 13. The discharge port 13 is opened toward the front of the turbocharger C, and is connected to an exhaust emission controller, which is not illustrated. Furthermore, when the turbine housing 4 is connected to the bearing housing 2 with the bolts 3, the opposing surfaces of the two housings 2, 4 form a passage 14. The passage 14 is formed into an annular shape from its inner to outer sides in the radial directions of the turbine shaft 7 (the turbine impeller 8).

The turbine housing 4 includes an annular turbine scroll passage 15. The turbine scroll passage 15 is situated outward of the passage 14 in the radial directions of the turbine shaft 7 (the turbine impeller 8), communicates with a gas inlet 4a (see FIG. 3) to which an exhaust gas emitted from an exhaust port of the engine is guided, and communicates with the passage 14 as well. For this reason, the exhaust gas from the engine is guided from the gas inlet 4a to the turbine scroll passage 15, and is further guided to the discharge port 13 via the passage 14 and the turbine impeller 8. During its flowing process, the exhaust gas rotates the turbine impeller 8. The torque of the turbine impeller 8 is transmitted to the compressor impeller 9 via the turbine shaft 7, and thereby, the compressor impeller 9 rotates. The torque of the compressor impeller 9 boosts the pressure of the fluid taken in, and the resultant fluid is guided to the intake port of the engine.

Figure 2:
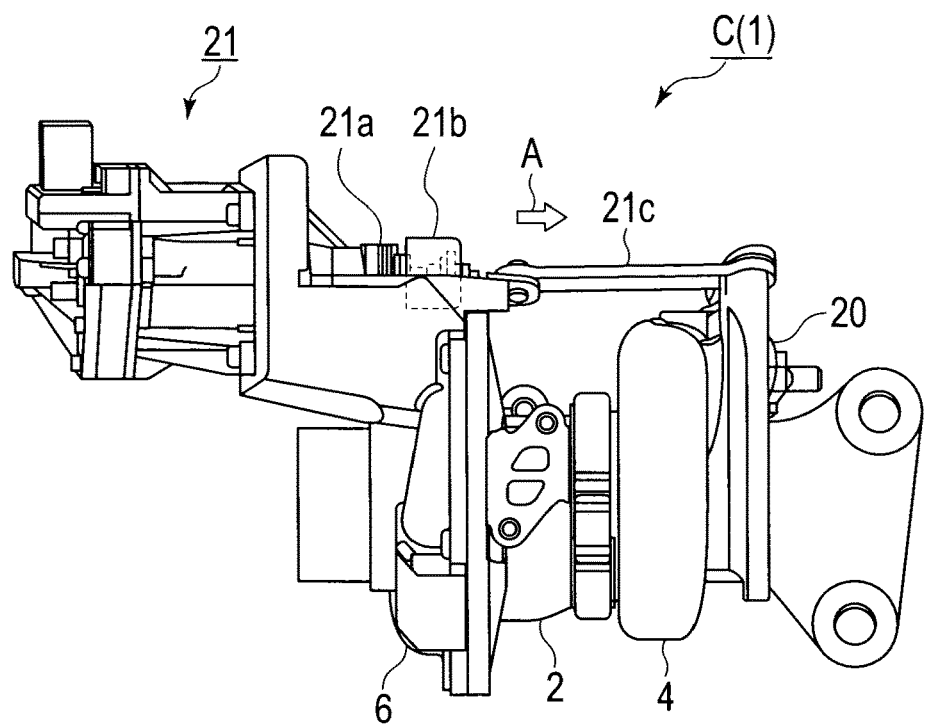
FIG. 2 is a front view of the turbocharger.
Figure 3:
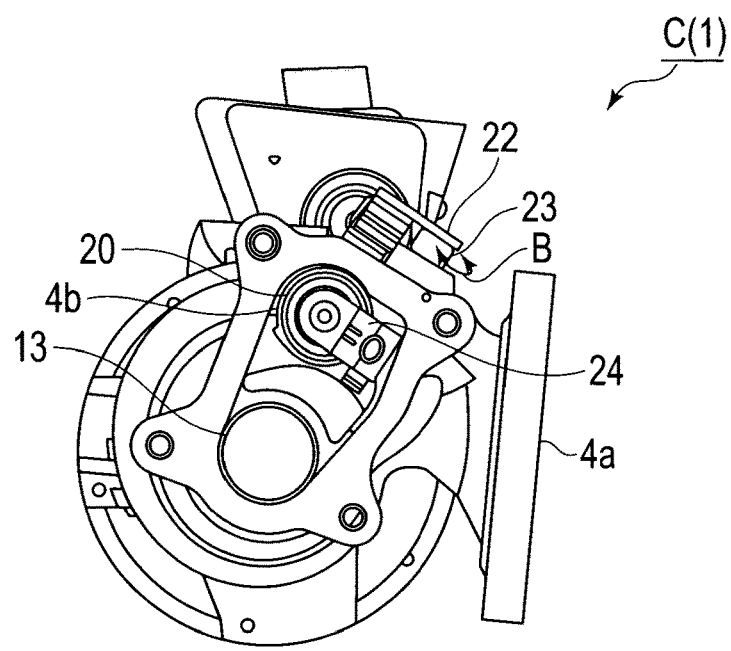
FIG. 3 is a side view of the turbocharger.

FIG. 2 is a front view of the turbocharger C. FIG. 3 is a side view of the turbocharger C. As shown in FIG. 3, the turbine housing 4 is provided with a bypass hole 4b. The bypass hole 4b penetrates the turbine housing 4 from a wall portion between the gas inlet 4a and the turbine scroll passage 15 toward the surface to which the discharge port 13 is opened. Part of the fluid to be guided to the turbine impeller 8 can bypass (flow to the downstream of) the turbine impeller 8 via the bypass hole 4b. A wastegate valve 20 functions as an on-off valve configured to close the bypass hole 4b by coming into contact with the bypass hole 4b, and to open the bypass hole 4b by becoming separated from the bypass hole 4b. In other words, the wastegate valve 20 makes part of the fluid to be guided to the turbine impeller 8 flow to the downstream of the turbine impeller 8 while bypassing the turbine impeller 8.

The wastegate valve 20 is connected to an electrically-operated actuator 21. The electrically-operated actuator 21 includes: an actuation unit 21a made from a motor or the like; and a rod 21c connected to the actuation unit 21a. A heat shield plate 21b is attached to the actuation unit 21a. The heat shield plate 21b blocks radiant heat from heat sources such as the engine. As shown in FIG. 2, the rod 21c moves in a direction indicated with an arrow A in response to the actuation by the actuation unit 21a.

One end of a connecting member 22 is turnably supported by the extremity of the rod 21c, while the other end of the connecting member 22 is fixed to one end of a turnably-supported shaft 23. The other end of the shaft 23 is connected to the wastegate valve 20 by use of an attachment plate 24. For this reason, once the rod 21c moves in the direction indicated with the arrow A, the connecting member 22 turns around its end portion fixed to the shaft 23. The turn of the connecting member 22 makes the shaft 23 turn in a direction indicated with an arrow B in FIG. 3. The valve lift of the wastegate valve 20 is adjusted in accordance with how much the shaft 23 turns.

Thereby, the electrically-operated actuator 21 adjusts the amount of the fluid (exhaust gas) to bypass the turbine impeller 8 by operating the connecting member 22, suppresses the pressure of the exhaust gas flowing into the turbine scroll passage 15 from the gas inlet 4a, and adjusts rotation output from the turbine impeller 8.

Figure 4:
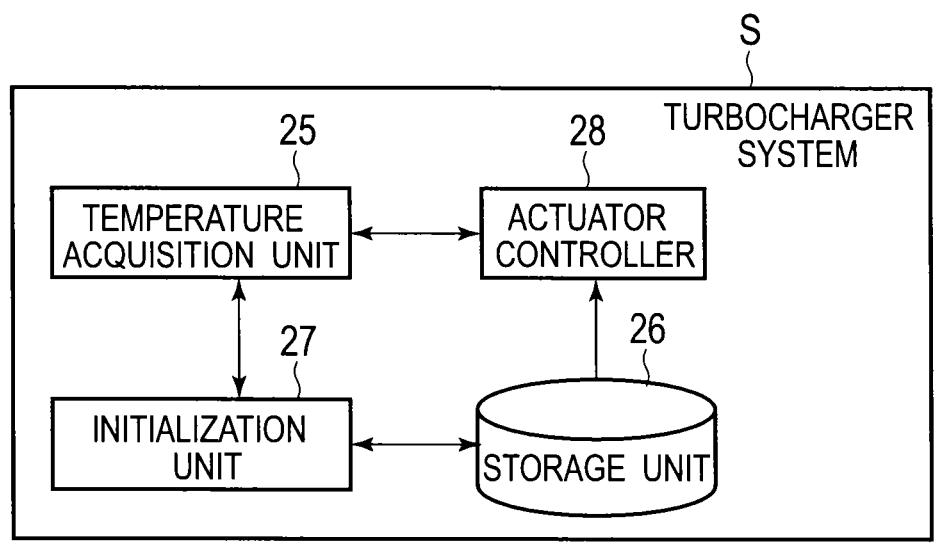
FIG. 4 is a block diagram for explaining how an electrically-operated actuator is controlled.

FIG. 4 is a block diagram for explaining how the electrically-operated actuator 21 is controlled in a turbocharger system S. The turbocharger system S is formed from the above-described turbocharger C, and an engine control unit (ECU) for the engine connected to the turbocharger C. FIG. 4 shows a functioning section in the ECU which constitutes the turbocharger system S, the functioning section being involved in controlling the actuator 21. Descriptions for other functioning sections of the ECU will be omitted. Here, the functioning section involved in controlling the electrically-operated actuator 21 does not always have to be incorporated in the ECU. Instead, the functioning section may be incorporated in a different control unit.

A temperature acquisition unit 25 shown in FIG. 4 acquires a target temperature by use of a temperature sensor, albeit not illustrated, in accordance with control by one of an initialization unit 27 and an actuator controller 28, which will be described later.

The target temperature is that which correlates with the temperature of the turbocharger body 1. Examples of the target temperature include: a measured value of the temperature of the external wall of the turbine housing 4; and a measured value of the temperature of the surface of the rod 21c of the electrically-operated actuator 21. Otherwise, the target temperature may be a measured value of the temperature of the exhaust gas flowing into the turbine housing 4, or a measured value of the temperature of a catalyst (the exhaust emission controller) connected to the turbocharger C and provided in an exhaust gas passage of the engine. In addition, the temperature acquisition unit 25 may acquire the temperature from the temperature sensor at all times, or only when an instruction to measure the temperature comes from the initialization unit 27 or the actuator controller 28.

A storage unit 26 is formed from a storage medium such as a flash memory. The storage unit 26 stores a reference value associated with a reference temperature (normal temperature in the embodiment) in accordance with control from the initialization unit 27. In this respect, the reference value is a control value (voltage) to be inputted into the electrically-operated actuator 21 when the wastegate valve 20 becomes fully closed at the reference temperature.

In accordance with the control from the initialization unit 27, the storage unit 26 stores association information in which correction values at target temperatures are associated with the target temperatures. Each correction value is a difference value between the reference value and the control value to be inputted into the electrically-operated actuator 21 when the wastegate valve 20 becomes fully closed at the target temperature. In this respect, the storage unit 26 stores as the association information a table in which the target temperatures and the correction values are associated with one another.

In a process of setting the turbocharger system S during a normal-temperature period, the reference value is determined as follows. First of all, the initialization unit 27 makes the temperature acquisition unit 25 acquire the target temperature in accordance with the user's input manipulation, for example. Subsequently, the initialization unit 27 sets the acquired target temperature as the reference temperature, and outputs a provisional control value corresponding to the temperature to the electrically-operated actuator 21. In this respect, the user fine-tunes the control value by performing the input manipulation on the initialization unit 27 in order to make the wastegate valve 20 become closed just fully. Instead, however, an operation program or the like may perform the input manipulation on the initialization unit 27. Thereafter, the initialization unit 27 makes the storage unit 26 store as the reference value a control value inputted when this tuning makes the wastegate vale 20 become fully closed.

When the wastegate valve 20 comes into contact with and hits the bypass hole 4b in conjunction with the movement of the rod 21c of the electrically-operated actuator 21, the wastegate valve 20 becomes fully closed. The position of the rod 21c when the wastegate valve 20 becomes fully closed is checked, for example, by a position sensor, a load sensor or the like which is provided inside or outside the electrically-operated actuator.

In a process of setting the turbocharger system S during a hot period, the correction value is determined as follows. In this respect, the hot period means a state where (a period of time in which) the turbocharger C is exposed to a temperature accompanying thermal expansion or thermal contraction. An example of the hot period is a state where the engine to which the turbocharger C is connected is in operation. In this case, the exhaust gas at a high temperature corresponding to the operating condition is guided to the turbocharger C, and the turbocharger C is accordingly heated. First of all, the initialization unit 27 makes the temperature acquisition unit 25 acquire the target temperature, for example in accordance with the user's input manipulation. Thereafter, the temperature acquisition unit 25 outputs the control value based on the acquired target temperature to the electrically-operated actuator 21. The user, the operation program or the like fine-tunes the control value by performing the input manipulation on the initialization unit 27 in order to make the wastegate valve 20 become closed just fully. Subsequently, the initialization unit 27 calculates a difference value between the reference value and the control value inputted when the tuning makes the wastegate valve 20 become fully closed. Furthermore, the initialization unit 27 sets the calculated difference value as the correction value, associates this correction value with the target temperature, and makes the storage unit 26 store the associated combination as the association information.

While the engine connected to the turbocharger C is in operation, the actuator controller 28 controls the electrically-operated actuator 21 on the basis of the target temperature acquired by the temperature acquisition unit 25. To put it in detail, the actuator controller 28 identifies the correction value on the basis of: the target temperature acquired by the temperature acquisition unit 25; and the association information stored in the storage unit 26. Subsequently, the actuator controller 28 calculates a control value (voltage) by adding or subtracting the identified correction value to or from the control value inputted into the electrically-operated actuator 21. On the basis of the calculated control value, the actuator controller 28 controls the electrically-operated actuator 21.

The control value inputted into the electrically-operated actuator 21 is calculated on the basis of the valve lift of the wastegate valve 20. The valve lift of the wastegate valve 20 is determined by the ECU with the number of revolutions of the engine, the engine intake and displacement, and the like taken into consideration.

Figure 5A:
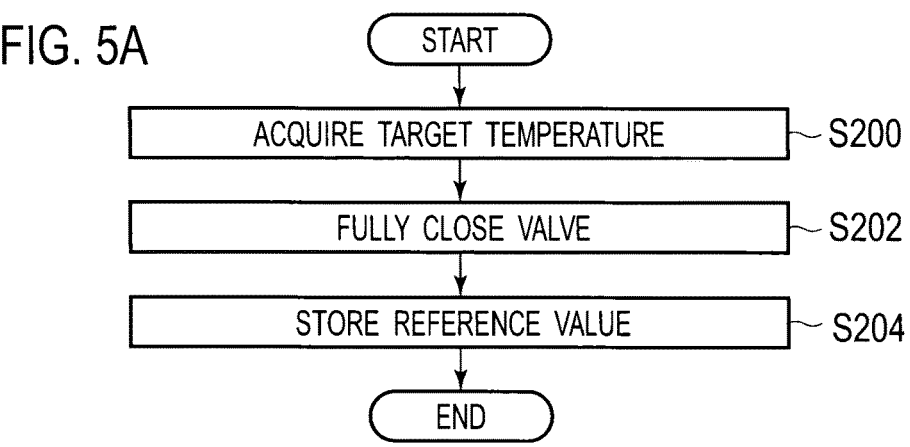
FIGS. 5A to 5C depicts flowcharts for explaining a method of controlling a turbocharger system.
Figure 5B:
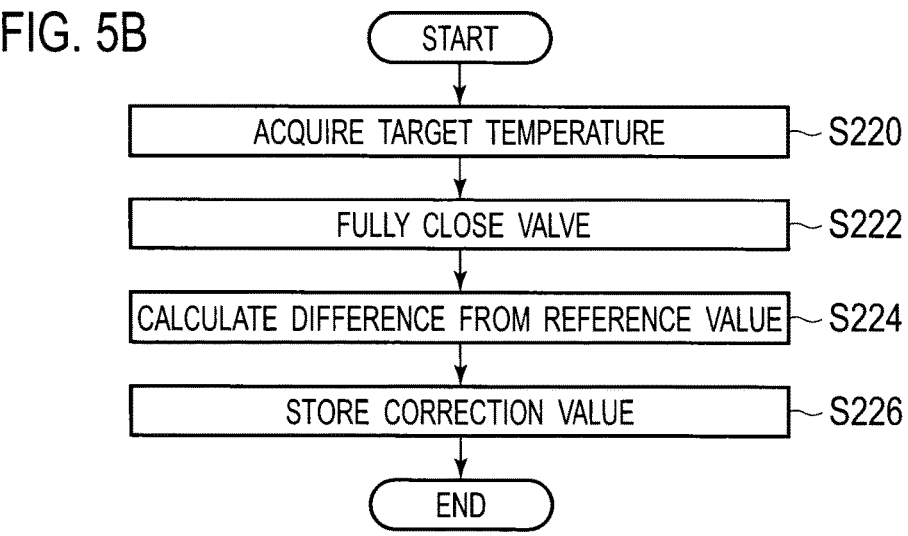
Figure 5C:
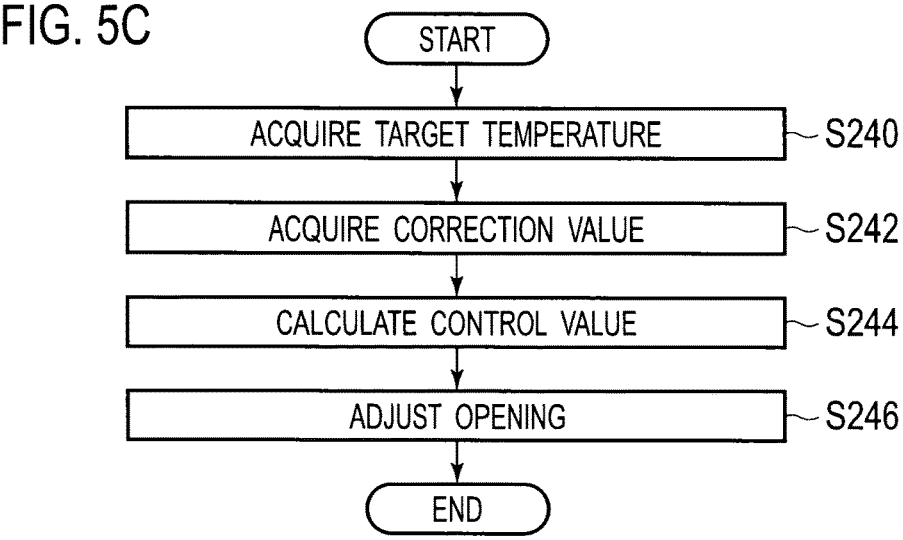

FIGS. 5A to 5C depict flowcharts for explaining a method of controlling the turbocharger system S. In particular, FIG. 5A shows a flow of a process of setting the turbocharger system S during the normal-temperature period; FIG. 5B shows a flow of a process of setting the turbocharger system S during the hot period; and FIG. 5C shows a flow of a process of setting the turbocharger system S during operation.

First of all, during the normal-temperature period, as shown in FIG. 5A, the initialization unit 27 acquires the target temperature from the temperature acquisition unit 25, and sets the acquired target temperature as the reference temperature (S200). Thereafter, the initialization unit 27 makes the wastegate valve 20 become fully closed, for example in accordance with the user's input manipulation, the operation program's input process, and the like (S202). After that, the initialization unit 27 makes the storage unit 26 store as the reference value the control value (voltage) which is inputted into the electrically-operated actuator 21 when the wastegate valve 20 becomes fully closed (S204).

Subsequently, during the hot period, as shown in FIG. 5B, the initialization unit 27 acquires the target temperature from the acquisition unit 25 (S220).

Like in step S202, the initialization unit 27 makes the wastegate valve 20 become fully closed, for example in accordance with the user's input manipulation, the operation program's input process, and the like (S222). The initialization unit 27 subtracts the control value inputted at this time into the electrically-operated actuator 21 from the reference value stored in the storage unit 26 (S224), and makes the storage unit 26 store the obtained difference as the correction value in association with the target temperature (S226).

Such a process shown in FIG. 5B is performed under each of multiple operating conditions, i.e., for each of multiple different target temperatures.

As shown in FIG. 5C, in a case where the opening of the bypass hole 4b is adjusted while the turbocharger C is in operation, the actuator controller 28 acquires the target temperature T from the temperature acquisition unit 25 (S240). The actuator controller 28 refers to the table which is the association information stored in the storage unit 26. In the table, for example, the correction values are associated with predetermined target temperature ranges, respectively. The actuator controller 28 acquires the correction value associated with the target temperature T acquired from the temperature acquisition unit 25 (S242).

The actuator controller 28 calculates an appropriate control value for the target temperature T by adding the acquired correction value to the reference value stored in the storage unit 26 (S244). Furthermore, the actuator controller 28 controls the electrically-operated actuator 21 on the basis of the calculated control value, and thereby adjusts the valve lift of the wastegate valve 20 (S246).

As described above, in the turbocharger system S of the embodiment, the actuator controller 28 controls the electrically-operated actuator 21 depending on the target temperature. For this reason, the turbocharger system S is capable of appropriately adjusting the valve lift of the wastegate valve 20, even if depending on the use conditions, changes in the temperature of the turbocharger body 1 thermally expand the turbocharger body 1 and the electrically-operated actuator 21, hence resulting in changes in the relative positions of the wastegate valve 20 and the bypass hole 4b to be closed by the wastegate valve 20.

The storage unit 26 may store, as the association information, an arithmetic expression enabling the correction value to be calculated from the target temperature.

Figure 6:
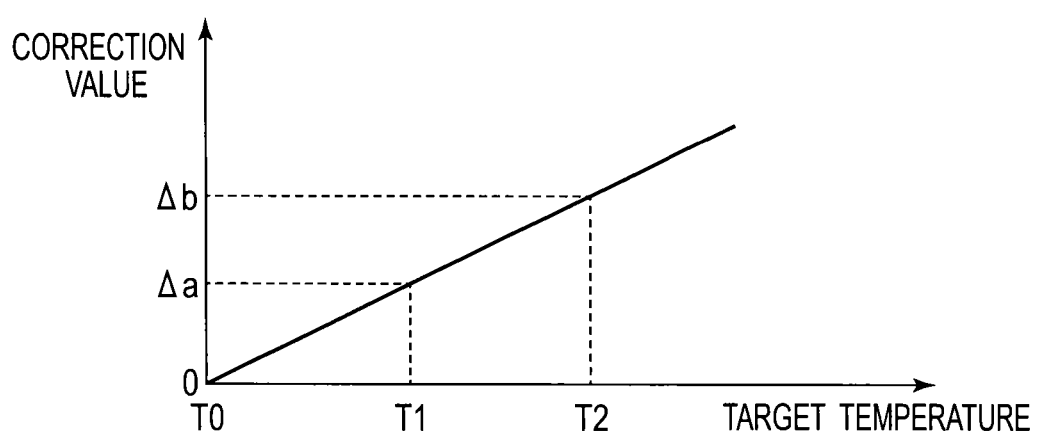
FIG. 6 is a graph showing an example of a relationship between a target temperature and a correction value.

FIG. 6 is a graph showing an example of a relationship between the target temperature and the correction value. Descriptions will be provided for the graph citing the example where: the control value inputted into the electrically-operated actuator 21 at normal temperature T0 is set as the reference value; and the target temperature and the correction value corresponding to the reference value are in proportion to each other.

After performing the process shown in FIG. 5B under the multiple operating conditions, the initialization unit 27 derives the arithmetic expression (a proportional expression in this case), which enables the correction value to be approximately calculated from the target temperature, on the basis of the target temperature and the correction value stored in the storage unit 26. Then, the initialization unit 27 makes the storage unit 26 store the arithmetic expression.

Thereby, using the arithmetic expression, the actuator controller 28 becomes capable of identifying the correction value for a target temperature T1 as a correction value Δa, and the correction value for a target temperature T2 as a correction value Δb, as shown in FIG. 6.

When the arithmetic expression is used as the association information, the turbocharger system S only needs to store the arithmetic expression in the storage unit 26 instead of storing the table therein. Accordingly, the storage capacity needed for the storage unit 26 can be reduced. In addition, the turbocharger system S is capable of identifying a single correction value uniquely for one target temperature unlike when the turbocharger system S identifies the correction value on the basis of the table, and accordingly can achieve more delicate control.

On the other hand, when the table is used as the association information as described above, the turbocharger system S need not perform the arithmetic process for calculating the control value from the target temperature, and is capable of acquiring the correction value by just referring to the table. For this reason, the turbocharger system S is capable of reducing the process load unlike when the arithmetic expression is used as the association information. Furthermore, even if the relationship between the target temperature and the control value is too complicate to be expressed with the arithmetic expression, the turbocharger system S is capable of dealing with the relationship by storing the target information in the storage unit 26 in the form of a simple table.

For this reason, it is desirable to determine whether the table or the arithmetic expression should be stored as the association information, depending on the capacity of the storage unit 26, the processing capabilities of the initialization unit 27 and the actuator controller 28, and the like.

Moreover, the configuration of the initialization unit 27 is not limited to that in which: the normal temperature T0 is used as the reference temperature; and the control value which makes the wastegate valve 20 become fully closed at the normal temperature T0 is used as the reference value. Instead, the configuration of the initialization unit 27 may be that in which: a target temperature while the engine is in operation, for example a target temperature T1, is used as the reference temperature; and a control value which makes the wastegate valve 20 become fully closed at the target temperature T1 is used as the reference value. Furthermore, if the highest possible temperature under the operating conditions is used as the target temperature T1, a control value corresponding to the highest possible temperature may be used as the upper limit value on the control value which makes the wastegate valve 20 become fully closed. As the target temperature becomes higher, the thermal expansion makes the relative position of the wastegate valve 20 closer to the bypass hole 4b. When the control value corresponding to the highest possible temperature under the operating conditions is set as the upper limit value, it is possible to inhibit an excessive load from being applied to the wastegate valve 20, the rod 21c of the electrically-operated actuator 21, and the like while the wastegate valve 20 is fully closed.

Although in the foregoing embodiment, the control values and the correction values are expressed in the form of voltages, the control values and the correction values may be expressed in the form of currents instead. In addition, the control values and the correction values may be expressed in the form of analog signals or digital signals.

The foregoing descriptions have been provided for the preferable embodiment of the present invention. However, it goes without saying that the present invention is not limited to such an embodiment. It is obvious to those skilled in the art that various modifications and corrections are possible within the scope as defined in the appended claims, and that such modifications and corrections are naturally encompassed by the technical scope of the present invention as well.

What is claimed is:

1. A turbocharger system comprising:
    a turbocharger body including a compressor housing and a turbine housing including a bypass hole;
    a turbine shaft rotatably supported by the turbocharger body, and linking a turbine impeller in the turbine housing and a compressor impeller in the compressor housing;
    a wastegate valve configured to make part of a fluid to be guided to the turbine impeller flow to a downstream of the turbine impeller while bypassing the turbine impeller through the bypass hole in the turbine housing;
    an electrically-operated actuator connected to the wastegate valve, and configured to adjust a valve lift of the wastegate valve with respect to the bypass hole; and
    an electronic control unit configured to
    acquire a target temperature which is any one of a temperature of the turbocharger body and a temperature correlating with the temperature of the turbocharger body, compensate for thermal expansion changes in relative positions of the wastegate valve and the bypass hole by controlling a control value to be input to the electrically-operated actuator on the basis of the target temperature to determine a corrected control value, and control the electrically-operated actuator with the corrected control value.

2. The turbocharger system according to claim 1, further comprising a storage medium configured to store association information which associates a correction value with the target temperature, wherein
    the correction value is a difference value between a control value inputted into the electrically-operated actuator when the wastegate valve becomes fully closed at the target temperature associated with the correction value, and a reference value which is a control value inputted into the electrically-operated actuator when the wastegate valve becomes fully closed at a reference temperature,
    on the basis of the association information, the electronic control unit identifies the correction value from the target temperature, and
    the electronic control unit calculates control value by adding or subtracting the identified correction value to or from an input value for control of the electrically-operated actuator, and controls the electrically-operated actuator on the basis of the corrected control value.

3. The turbocharger system according to claim 2, wherein the association information is a table in which the target temperature and the correction value are associated with each other.

4. The turbocharger system according to claim 2, wherein the association information is an arithmetic expression enabling the correction value to be calculated from the target temperature.

5. The turbocharger system according to claim 1, wherein the corrected control value is a voltage.

* * * * *